(12) United States Patent
Angel

(10) Patent No.: US 7,396,550 B2
(45) Date of Patent: Jul. 8, 2008

(54) TIME RELEASED NUTRITIONAL PRODUCT AND METHOD OF MANUFACTURE

(76) Inventor: Michael G. Angel, 36041 Bergen St., Winchester, CA (US) 92596

( * ) Notice: Subject to any disclaimer, the term of this patent is extended or adjusted under 35 U.S.C. 154(b) by 656 days.

(21) Appl. No.: 10/457,089

(22) Filed: Jun. 5, 2003

(65) Prior Publication Data

US 2004/0247768 A1    Dec. 9, 2004

(51) Int. Cl.
*A23L 1/10*    (2006.01)
(52) U.S. Cl. .................. 426/96; 426/303; 426/331; 426/549; 426/618
(58) Field of Classification Search ................ 426/96, 426/303, 331, 549, 618, 620, 519, 520
See application file for complete search history.

(56) References Cited

U.S. PATENT DOCUMENTS

| | | | |
|---|---|---|---|
| 1,839,928 A | 1/1932 | Perky | |
| 2,517,595 A | 8/1950 | Owens et al. | |
| 2,611,708 A | 9/1952 | Owens et al. | |
| 3,680,291 A | 8/1972 | Soteropulos | |
| 3,744,401 A | 7/1973 | Polan | |
| 4,038,427 A | 7/1977 | Martin | |
| 4,348,379 A | 9/1982 | Kowalsky et al. | |
| 4,603,055 A | 7/1986 | Karwowski et al. | |
| 4,769,253 A | 9/1988 | Willard | |
| 4,834,988 A | 5/1989 | Magliacano et al. | |
| 4,994,286 A | 2/1991 | Greer | |
| 5,024,996 A | 6/1991 | Ringe | |
| 5,035,913 A | 7/1991 | Sky | |
| 5,122,379 A | 6/1992 | Ohta et al. | |
| 5,137,745 A * | 8/1992 | Zukerman et al. | 426/618 |
| 5,246,723 A | 9/1993 | Kameyama et al. | |
| 5,360,614 A | 11/1994 | Fox et al. | |
| 5,759,612 A | 6/1998 | van Dalsem et al. | |
| 5,776,887 A | 7/1998 | Wibert et al. | |
| 6,503,555 B1 * | 1/2003 | Katta et al. | 426/618 |

(Continued)

FOREIGN PATENT DOCUMENTS

EP    0631728 A1    1/1995

(Continued)

OTHER PUBLICATIONS

Elwood F. Caldwell et al., Chapter 3, "Unit Operations and Equipment . . . ," Breakfast Cereals and How They Are Made, American Assoc. of Cereal Chemists, Inc., 2nd Edition, 2000, pp. 55-131.

(Continued)

*Primary Examiner*—Helen F Pratt
(74) *Attorney, Agent, or Firm*—Luce, Forward, Hamilton & Scripps LLP; Mitchell P. Brook, Esq.

(57) ABSTRACT

A time released nutritional food product and method of making it in is provided in which the product includes a plurality of grain or seed based constituents having plural digestion rates. In a preferred embodiment the product can be prepared by cooking the constituent parts together as a mixture at a substantially single length of cooking time. For example, the product while palatable, can be cooked by adding water, boiling for a given amount of time and eaten. In an embodiment the constituent parts include processed and unprocessed grains, at least one of which forms a gelatinous coating on the others when cooked.

17 Claims, 2 Drawing Sheets

U.S. PATENT DOCUMENTS

| | | | |
|---|---|---|---|
| 6,761,923 B2 * | 7/2004 | Arndt et al. | 426/618 |
| 2002/0122815 A1 | 9/2002 | Peroutka | |
| 2005/0163910 A1 * | 7/2005 | Angel | 426/629 |

FOREIGN PATENT DOCUMENTS

| | | |
|---|---|---|
| EP | 0749697 A1 | 12/1996 |
| EP | 0631728 B1 | 11/1998 |

OTHER PUBLICATIONS

Haines B. Lockhart et al., Chapter 10, "Nutrition of Oats," Oats: Chemistry and Technology, American Association of Cereal Chemists, Inc., 1986, pp. 297-308.

Jennifer Warner, "Whole-Grain Cereal Saves Lives, Choosing the Right Breakfast Cereal Could Make a Big Difference," American Journal of Clinical Nutrition, Feb. 26, 2003, p. 1.

Kent Salisbury(Oats), Warren Formo (Corn) and Tom Jorgens (Barley), "Unique Beneficial and Processing Properties of Grains," Grains for the Health of It: Increasing Grains . . . Symposium Proceedings. Sep. 20-21, 2001, pp. 79-85.

Joanne Slavin, P.h.D., "Physiology and Health Benefits of Whole Grains," Grains for the Health of It: Increasing Grains . . . , Symposium Proceedings, Sep. 20-21, 2001, pp. 21-25.

* cited by examiner

US 7,396,550 B2

TIME RELEASED NUTRITIONAL PRODUCT AND METHOD OF MANUFACTURE

FIELD OF THE INVENTION

The present invention relates to a time released nutritional product containing components that are digested at different rates providing nutritional value over relatively short, medium and long periods of time. In particular, the present invention relates to a cooked food product containing components that are cooked over a substantially single time period, and when eaten nutritional intake over varying periods of time and to a method of manufacturing the corresponding uncooked food product.

BACKGROUND OF THE INVENTION

Various types of ready-to-eat and cooked cereal products are known. For example, various processed cereal products are known. Such cereal products frequently are made of uniformly processed grains that typically include a processed flour form, which is formed into a desired shape, and baked, toasted or otherwise pre-prepared. Various additives such as sugar or dried fruits are added. Among such processed cereal food products are "Cheereos" or "Wheaties" from General Mills Corp., located in Minneapolis, Minn.

Various forms of cereal products to be cooked are also known. One example is oatmeal, which typically includes a dry form of rolled oats, which is prepared by adding water and then boiled for a period of time until a desired consistency is achieved. One example of an oatmeal product is "Quaker Oats" available from The Quaker Oats Company, Chicago, Ill. Cereal products such as this that are available in a dry form and meant to be cooked will be referred to herein as "cooked cereal" products.

Some ready-to-eat and cooked cereal products have a disadvantage in that the product is digested over a relatively short period of time. For examples cereal products made of a grain or grains that is/are processed in a single way tends to be digested within a given time period. Easy to digest flour based products can typically be digested over a relatively short period of time. With such a product one tends to get hungry relatively quickly after eating. Various known ready-to-eat and cooked cereal products suffer this disadvantage.

One known cereal product directed to providing a longer period of digestion is described in U.S. Pat. No. 5,759,612. The product is meant to be digested over an extended period of time providing for the release of energy over an extended period of time. Components of varying levels of fiber and degree of cook are selected. However, this product suffers a number of disadvantages, including that preparation requires several different cooking steps under different preparation conditions, such as preparing different components in separate batches.

De-hulled whole grain oats, known as groats, have various known nutritional benefits including high fiber, and relatively slow digestion times. Likewise bumped oat groats, which are lightly processed groats have relatively slow digestion times. Other forms of oats, such as cut oats also have some of these benefits, but a generally faster digestion time than groats, but still slower than rolled oats. One disadvantage of a cooked or liquid cereal product including groats, bumped oats, or cut oats is that a relatively long cooking time is required in order to soften the groats sufficiently to be swallowed with ease. Without sufficient softening, the groat or steel cut oat can remain relatively hard and undesirable for human consumption.

Hot grain cereals on the market today typically provide only one milling process (i.e. rolling) and therefore a uniform digestion process that does not regulate carbohydrate or other nutrition delivery times, nor do they typically provide different grain milling types that have different digesting times and carbohydrate delivery.

In addition, intact whole grain (i.e. with or without hulls, but including the testa or seed coating) is considered to provide health benefits, such as including naturally occurring nutrients and phytochmicals. However, the above-discussed products suffer a disadvantage in that they typically cannot make use of whole unprocessed grains, which are viewed as not susceptible of inclusion in a commercial product, without at least some processing.

It is understood that the high and frequent pervasive consumption of high glycemic index foods in common modern diets can result in various health problems, such as obesity and type 2 diabetes. Furthermore, high-glycemic index diets result in high levels of insulin, which increase hunger and favor fat deposition. Staving off a hungry feeling is understood to be one reason for obesity, in which a hungry feeling results in further food consumption. Low satiety occurring with high-glycemic index foods translates into significantly increased food and calorie consumption leading to weight gain in many people. Satiety is a function several food attributes: the glycemic index, level of dietary fiber, starch resistance, digestion time, and carbohydrate availability or delivery.

Therefore, there exists a need for a liquid or cooked cereal product that includes grains with plural digestion time rates, which can be used for regulating carbohydrate or other nutrition delivery to consumers, and also for specific use to control carbohydrate delivery. There also exists a need for foods that provide a regulated nutrition and especially carbohydrate delivery for blood glucose level control and treatment of diabetes. There also exists a need foor foods that provide regulated nutrition delivery in order to control appetite and provide assistance with dieting or other treatment of obesity. Furthermore, there exists a need for a liquid or cooked cereal product that has relatively simple manufacture and preparation processes. In addition, there exists a need for other grain or seed based products having varied rates of nutrition time release.

SUMMARY OF THE INVENTION

The present invention alleviates to a great extent the disadvantages of known cereal and grain or seed products by providing a time released nutritional product and method of making it in which the product includes a plurality of grain or seed based constituents having plural digestion rates. In a preferred embodiment the product can be prepared by cooking the constituent parts together as a mixture at a substantially single length of cooking time. For example, the product while palatable, can be cooked by adding water, boiling for a given amount of time and eaten.

In a preferred embodiment, differing percentages of constituent parts are provided. The constituent parts may be one or more grain (or other type of seed) processed in one or more ways. As one example, one such food product includes different forms of oats combined together, such as part groats and/or part bumped groats and/or part steel cut oats and/or part rolled oats. It should be noted that each milling process can vary as well. For example in the bumped groats, differing degrees of bump can be selected. Likewise in the rolled oats, differing rolling distances can be selected. The different constituent parts are selected to provide particular ranges of digestion or nutrition delivery rates.

In one example, the food product is made of oats processed by a combination of three different ways: rolled (a flake product of selected rolling distances), steel cut (slices of whole grains of selected slice sizes), bumped groats and groats (de-hulled whole grain oats). Percentages of each of the three different processed oat products are combined. Rolled oats are digested relatively quickly providing relatively quick energy and nutrition delivery, steel cut oats are digested at a relatively slower rate, over a medium length of time, bumped groats and groats are digested a still longer period of time thus providing extended nutrition and energy delivery. Whole grains can be used as well.

In preparation of a hot or liquid food product, water is added and the cereal boiled for a desired period of time. Preferably a period of time is selected in which the rolled oats form a gelatinous composition coating the pieces of the other constituents, rendering them more swallowable than they otherwise would be.

It should be noted that in other embodiments, various combinations of other grains or seeds can be used, such as wheat, corn, barley, flax, maize etc. various combinations of processing methods are used. It is preferred that at least one of the grain products, when cooked forms a gelatinous composition capable of coating other constituents.

Besides cereal mixtures, other forms of time released food products and carbohydrate delivery systems are provided in accordance with the present invention. For example, prepprepared hot breakfast cereals, food additives to other foods, cookies and energy/nutrition bars can be prepared in accordance with the invention.

In some embodiments, the food composition of the present invention can be used to provide a time released or otherwise regulated delivery of nutritional elements for uses as a diabetes treatment, for uses in dieting and in treatment of obesity.

These and other features and advantages of the present invention will be appreciated from review of the following detailed description of the invention, along with the accompanying figures in which like reference numerals refer to like parts throughout.

DETAILED DESCRIPTION OF THE PREFERRED EMBODIMENTS

In the following paragraphs, the present invention will be described in detail by way of example with reference to the attached drawings. Throughout this description, the preferred embodiments and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s). The "food product" and "food composition" of the present invention refer to an uncooked embodiment of the present invention, although it should be understood that other embodiments of the present invention are in cooked or liquid form.

Broadly speaking, the food product comprises a combination or mixture of a plurality of grain or seed based constituents having plural digestion or nutrition time release rates. By nutrition time release rates what is meant is that after eating, the nutritional elements are made available to the human body. Thus, the different constituent parts provide plural time ranges in which the nutritional elements, for example carbohydrates are absorbed from the digestive tract thereby becoming available to the body. The constituents include combinations of one or more grains or other seeds (or other constituents such as dried fruit), each processed or milled in one or more different processes yielding a food product having components with varying rates of digestion.

In the preferred embodiment the food product is first assembled as a mixture of the various constituents. Optionally a consumer or manufacturer then takes it as the basis of a prepared food product. Examples of such prepared food products are liquid or cooked cereal, energy or nutrition bars, cookies, cakes etc.

Figure 1:
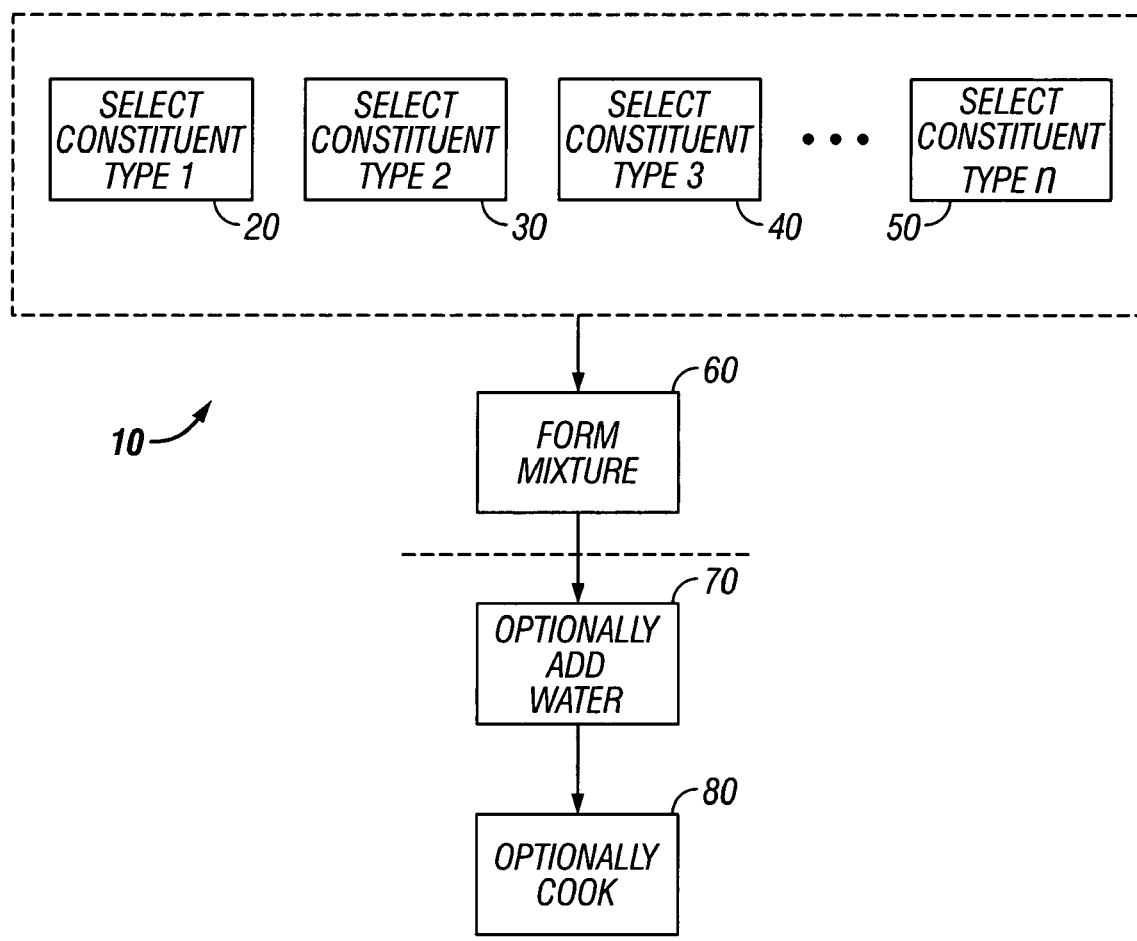
FIG. 1 is flowchart illustrating a method of making a cereal in accordance with the present invention.

Methods of manufacturing the food product of the present invention will be discussed with reference to FIGS. 1 and 2, and following the discussion of manufacturing, embodiments of the prepared food product will be discussed. FIG. 1 provides a generalized description of the method. In the box identified with reference number 10, the types of constituents are selected. This step includes selecting among different types of grains or seeds, such as for example, oats, rye, wheat, spelt, corn, flax, barley, etc. In an alternative embodiment, the constituents can include other types of food products, such as dried fruit, nuts, chocolate, etc. In addition different forms of processing for the selected grains and seeds are selected in step 10. For example, ground flour, rolled, cut, bumped groats, kernel, whole grain or otherwise milled or physically modified grains and seeds. It should be noted that each of these processes can be selected with particular parameter producing different constituent parts. For example, rolled grains can be produced at different roller separation settings yielding different width flakes. Likewise, cut grains can be created with different width of cuts. Preferably the grains or seeds and processings are selected to achieve a cereal having constituents of differing digestion or nutrition release rates.

Preferably, one or more constituents are selected, which when cooked form a gelatinous composition that can coat one or more other constituents. So in this embodiment, the food product includes a plurality of constituents having more than one digestion, energy or nutrition delivery rates, and includes a gelatinized starch composition coating at least a portion of at least one of the constituent parts.

Selections of different constituents are diagrammatically illustrated with the boxes identified with reference numerals 20, 30, 40 and 50, in which constituent 1, constituent 2, constituent 3 through constituent "n" are selected. Likewise, the percentages of each constituent are selected. In one example, only Oats are selected as the grain and different forms of oats are used as the constituent parts. 1-99% rolled oats are selected, 1-95% groats are selected and 1-95% steel cut oats are selected. In another example groats and two types of rolled oats are selected as three constituents. In this example, the rolled oats are split among one or more roller separation settings producing different width flakes. In another example, 1-90% ground wheat is selected, 1-99% rolled oats is selected. Thus it is seen that "n" can be any number over two as the number of constituent parts required to make a mixture and any percentages may be selected such that desired varied rates of absorption, time release or digestion are provided and also preferably that at least one of the constituents when cooked can form a gelatinous composition.

Figure 2:
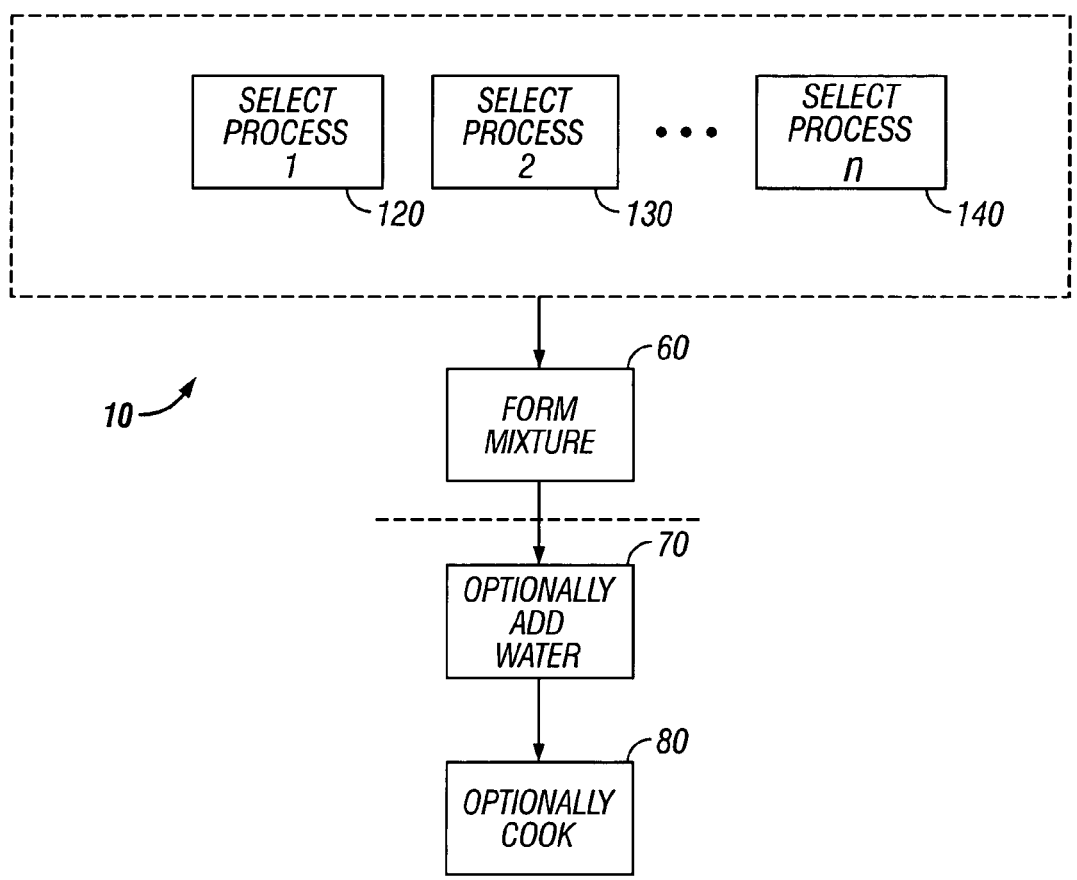
FIG. 2 is flowchart illustrating a method of making a cereal in accordance with another embodiment of the present invention.

FIG. 2 illustrates an embodiment in which varied processes of manufacture of the grain constituents are selected in step 10. In box 120, process 1 is selected, in box 130, process 2 is selected and in box 140, process "m" is selected, in which "m" can be any number, including one or higher. For example if different grains are used, only a single processing step may be used. Alternatively, numerous different processes may be selected. In one alternative embodiment, the processing is performed, although pre-processed grains can be selected. It should be noted that any type of process can be selected suitable for the grain or seed, or alternatively no processing can be selected. For example, no processing would mean a whole grain or seed is selected for one of the constituent parts. So in this example, for instance, in one of steps 120, 130 or 140, no processing is selected as a "process".

Following selection of the constituent parts and percentages, a mixture is formed in step 60. It is not necessary to stir the constituent parts to form a uniform mixture, but doing so is preferred to provide some uniformity when portions are prepared. The food product can then be packaged in any desired way for distribution to consumers. For example it can be packaged in cartons or polymeric bags or wax coated paper bags etc. Alternatively it can be packaged for bulk purchase by consumers such as in a container from which a consumer can spoon out a desired amount. Alternatively it is not packaged, but is mixed and then prepared for eating.

Optional step 70 is provided as an illustration of a preparation step. In that step water preferably is added in a desired proportion, and then in optional step 80 the food product is prepared for eating in some fashion. In one embodiment, step 80 is a cooking step in which the mixture (either alone or in combination with water added in step 70) is elevated over boiling point for a period of time. Preferably the period is sufficiently long to cook at least one of the constituent parts to yield a gelatinous composition that can coat one or more of the constituent parts. It should be noted that in one or more of steps 70 and 80 or additional processing steps, other types of processing can be performed, such as to create or package cookies, nutrition or energy bars, cakes, pastries etc.

In accordance with the invention in general, and as illustrated in the examples discussed herein, the cook time selected preferably causes the natural starch of at least one constituent part to convert by gelatinization and pasting to coat the other constituents of the food product in a plasticized-like viscous liquid film. For example the natural starch of rolled oats converts into gelatinized starch that coats steel cut oats and whole oat groats. This causes the steel cut oats and whole oats to be easily chewed and/or swallowed. This process allows component ingredients that would be difficult to chew and unpleasant to swallow if cooked alone, to be eaten due to the "gelatinized" starch coating that develops.

Likewise, in the preferred embodiment, differing percentages of different constituent parts can be used. For example, one or more grain or seed can be used; likewise various forms of milling or other processing of the grains can be used. In one example, different forms of oats are used, although different grains can be used as well. In the oats-only embodiment, one or more types of rolled, steel cut, bumped oats and groats are used in desired percentages. Rolled oats are digested relatively quickly providing relatively quick time release of energy and nutrition to the user. Steel cut oats are digested at a slower rate and over a medium length of time. Groats are processed via digestion over a longer period of time thus providing extended nutrition and energy. In this example, to consume, a mixture of the constituent parts of different forms of oats are combined with water and then cooked over a period of time. Likewise other food constituents can be added in, such as dried fruit, whole nuts, chocolate, etc. Only a single length of time needs to be used, as the constituent parts are cooked together in this example. In one preferred embodiment a cooking time of seventeen minutes is used. In seventeen minutes of cooking, the rolled oats turn into a gelatinous composition. The steel cut oats are medium cooked and the groats and bumped oats are cooked medium rare. In other words they still are fairly hard. However, because the rolled oat portion becomes gelatinous, the groats and steel cut oats become more palatable as the gelatinous mass coats the less cooked grains. In other words, the gelatinous fraction coats the other two fractions making them palatable. If cooked individually for a relatively short amount of time, such as seventeen minutes, the steel cut and the groats would be perceived as chewy and perhaps undercooked to a consumer. However, in combination with a constituent that generates a gelatinous coating when cooked, such as a rolled oats, a relatively short cook time can be used even with slower cook constituents such as whole grains, groats, and steel cut oats.

Examples of food products in accordance with the invention will be discussed below. It should be understood that these merely are examples of preferred embodiments, but other combinations of different constituent parts, and preparation procedures also may be used. It should be understood that in the examples that follow, the amounts are provided to show proportionality, and not limitation on the batch size.

EXAMPLE 1

A formula providing a uniform cooking time of a blend of oats is provided as an illustration of a time released food product. The following constituents are combined to form the food composition. It should be understood the amounts are provided to show proportionality, and not limitation on the batch size. ½ cup of rolled oat flakes (One half of each mill type: ¼ cup of 0.033" and ¼ cup of 0.037" rolled oats)

3 tablespoons of Steel Cut Oat Groats 2 tablespoons of Bumped Oat Groats 2 tablespoons of Whole Oat Groats.

In order to prepare for eating, about 2¼ cups of water can be added to the mixture and the mixture is brought to a rapid boil in a saucepan and stirred. Optionally it can be allowed to foam froth on top for 1 minute while stirring. Subsequently, optionally it can be covered while cooked, but preferred to be left uncovered. The mixture is allowed to simmer for 17 minutes, and stirred periodically.

In the above example, the cooked cereal optionally could be eaten hot or warm, or allowed to cool. Also optionally, it could be packaged for further distribution after being cooked, such as in jars or cartons.

It also should be noted that numerous variations can be practiced. For example, dried or dehydrated fruit can be prepackaged with the mixture. Alternatively, it can be added during preparation for eating. For example, ¼ cup of dried/dehydrated fruit can be added and preferably some more water is added in order to compensate for the water absorption during cooking by the added component. In one example ¼ cup of extra water is added. Examples of dried or dehydrated fruit include raisins and dried or dehydrated cranberries, blueberries, peaches, pineapples, cherries, etc. Nuts can be added as well.

Other variations include adding milk, or sweetener such as natural sweeteners like sugar, syrup or honey, or artificial sweeteners like aspartame or saccharine.

EXAMPLE 2

A formula providing a uniform cooking time of a blend of oats is provided. The following constituents are combined to form the food composition. It should be understood the amounts are provided to show proportionality, and not limitation on the batch size.

½ Cup of rolled oats
3 Tablespoons of whole oat groats
2 Tablespoons of steel cut oats In order to prepare for eating, about 2 cups of water can be added to the mixture and the mixture is brought to a rapid boil and stirred. Optionally it could be covered while cooked, but preferred to be left uncovered. The mixture was allowed to simmer for 17 minutes, and stirred periodically.

In the above example, the cooked cereal optionally could be eaten hot or warm, or allowed to cool. Also optionally, it could be packaged for further distribution after being cooked, such as in jars or cartons. It should be noted that the variations described above with respect to Example 1 apply equally as well to Example 2 and other embodiments as well.

EXAMPLE 3

Various other examples of variations of the time release food composition as a constituent of other foods as nutritional food additives have also been considered.

Examples of such embodiments include the following, added to one cup of the food composition in accordance with the present invention, such as for example, the food composition described above in Examples 1 and 2. It should be noted that depending on the particular recipe or individual taste other amounts of the food composition can be used.

1. Beef Risotto—Add one 14 oz. can of Swanson Beef Broth (99% Fat Free) or an equivalent thereof to the food composition described in Examples 1 or 2 (Optional: Drain and add one small can or jar of sliced button mushrooms); optionally bring to a boil and simmer for 17 minutes.
2. Chicken Risotto—Serve as side dish to chicken by adding one 14 oz. can of Swanson Chicken Broth (99% Fat Free) or an equivalent thereof, to the food composition described in Examples 1 or 2); optionally bring to a boil and simmer for 17 minutes. (Optional: Drain and add one small can or jar of sliced button mushrooms
3. Beef Stew—Brown 1 cup of lean ground beef in saucepan. Add two 14 oz. cans of Swanson Beef Broth (99% Fat Free) or an equivalent thereof, to the food composition described in Examples 1 or 2. Drain and add one can of red kidney beans OR one can of corn OR one cup of peas; optionally bring to a boil and simmer for 17 minutes. (Optional: Drain and add one can or jar of sliced button mushrooms)
4. Chili—Brown 1 cup of lean ground beef in saucepan with one chopped onion to sauté. Sprinkle 2 tablespoons of chili seasoning mix (or an equivalent thereof) on top and stir in. Add one 14 oz. can of Swanson Beef Broth (99% Fat Free), or an equivalent thereof. Add to the composition described in Examples 1 or 2 and stir in and bring to boil again. Then add one 15 oz. can of Hunt's Tomato Sauce (or equivalent) and one 10.75 oz. can of Campbell's Condensed Tomato Soup (or an equivalent). Drain and add one or two 15.25 oz. cans of Dark Red Kidney Beans. Optionally bring to rapid boil again and then low simmer for 17 minutes.
5. Beans'n Oats—Drain one approximately 15.25 oz. can of Dark Red Kidney, Small Navy, Great Northern, or Black Beans. Add water and bring to rapid boil again and then low simmer for 17 minutes.
6. Corn'n Oats—Add one approximately 15.25 oz. can of corn. Add water and bring to rapid boil and then low simmer for 17 minutes.
7. Peas'n Oats—Add one approximately 15.25 oz. can of peas. Add water and bring to rapid boil and then low simmer for 17 minutes.
8. Lentils'n Oats—Add about one cup of Lentils and two cups of water. Add additional water as desired in accordance with Examples 1 and 2, and bring to rapid boil and then low simmer for 17 minutes.
9. Cheesy Oats—After the food composition is cooked, stir in 12 oz. microwave melted Velveeta processed cheese.
10. Oatmeal and Oatmeal Raisin Cookies: Either add food composition into cookie dough and bake cookies as desired or alternatively, add water to food composition, cook, and then add cooked product into cookie dough and bake cookies as desired.

It should be noted that depending on the particular recipe or individual taste other amounts of the different ingredients in the above examples food composition can be used. Likewise, the particular brands of ingredients are provided only as examples, and other brands or sources can be used. The amounts are provided only as examples of particular food products that can be prepared, sold, or otherwise packaged and distributed, of a food product incorporating the food composition of the present invention.

Continuing with a general description of the invention, the food composition in one embodiment provides the constituent part (such as rolled oats) that generates "gelatinized" starch is digested relatively quickly, typically over about an hour or two in Examples 1 or 2 above. A "medium" release constituent (such as steel cut oats) is digested over a medium amount of time, such as about three to four hours in Examples 1 or 2. A "long" time release constituent (such as whole grain oats, groats etc.) is digested over an extended period, such as about five to eight hours in Examples 1 or 2. It should be understood that these time ranges of digestion are an example only to illustrate the short, medium and long time release rates. Actual time release or digestion rates in different individuals will vary. The food composition can be cooked with its components together generally for a single cooking time rather than plural times depending on the constituent type.

By using different processing preparations, with a generally uniform cooking time, the constituent components are cooked to varying degrees and have different physical properties that cause the digestion times to vary. Generally speaking, oats and other grains and seeds are covered with an outside hull. Inside the hull is a coating called the testa or seed coat that covers the carbohydrate and nutrient rich tissue center called the endosperm. By physically removing or modifying the outside hull and/or modifying the fibrous inside testa by various milling processes, or leaving the fibrous testa in a natural encased state, the degree to which each component is cooked and digested is controlled. The smaller fine ingredients cook to a relatively well done amount, the coarse ingredients cook to relatively "medium" amount, and the whole testa ingredients cook a relatively small or "rare" amount. Generally speaking, the greater the amount of cooking, the faster the ingredients are digested and nutrients are absorbed. In addition, generally speaking, the more fibrous testa or seed coating that is left intact, the slower the ingredients are digested and nutrients are absorbed.

In addition, by preserving a high fiber content in the ingredients other benefits are achieved, such as slowing the digestion of other foods eaten after the mix/blend is ingested, due to the absorption properties of the fiber. The high water absorption by the fiber tends to fill the gut without gas bloating and reduces appetite and food consumption as a result.

It should be understood that the food product of the present invention can be used to manage blood glucose response/levels by using a selected blend of time released (i.e. varying rates of digestion) carbohydrates, such as necessary for good nutrition of persons having diabetes. One way of ranking carbohydrate foods on how quickly carbohydrates enter the bloodstream and elevate blood sugar is a glycemic index (GI). Quickly digested and metabolized carbohydrates have the highest glycemic indexes. Their blood sugar or glucose response is fast and high. Slowly digested carbohydrates have low glycemic indexes and release glucose gradually into the bloodstream. Their blood sugar or glucose response is slow and steady.

It is understood that diets with a low glycemic load may be useful in preventing or regulating diabetes and coronary heart disease. In general, refined, starchy foods eaten in the have a relatively high glycemic index. The food composition of the present invention can be selected to provide a low glycemic index, while also being high in fiber (especially viscous fiber), having some starch that resists gelatinization, while also having other starch that gelatinizes, is digested at varying rates, and contains phytonutrients that slow digestion and absorption. When the food composition is eaten, it is understood that one mode benefit is that it provides both a time released carbohydrate AND slows the digestion and glycemic response of high-glycemic foods eaten at the current meal or the next meal eaten at a later time, acting like a fiber sponge that absorbs the shock and delays the release to slow digestion. Not only is the glycemic index affected by other components of a meal, it is also affected by food selections at prior meals. For instance, inclusion of the food composition of the present invention at a preceding meal can act to lower the glycemic index of a carbohydrate food in a later meal. This is called a lente carbohydrate effect. In addition, it is understood that ingestion of a food with either a low or moderate glycemic index prior to exercise improve can improve endurance, a further advantage of the present invention.

Slowly released starches, such as those in some forms of oatmeal, tend to have low glycemic indexes, even if they are fully digested and have been found to be useful to add to the diet of diabetics for regulating blood glucose levels. The larger and more intact the particle size, the lower the glycemic index. Thus, in selecting the constituent parts of the food composition of the present invention it is desired to include at least a portion of constituent(s) that provide a relatively low glycemic index.

It is understood that a reduction in diabetic side effects can be achieved with the regular selection of starchy foods with relatively moderate or low glycemic indices. An example of one such side effect is elevated blood lipid levels. This reduction of diabetic side effects is provided by the food composition of the present invention and in addition, the food composition improves the entire health of an individual's diet by counter balancing the effect of a high-glycemic diet. The health effect is realized by adding the food composition of the present invention to an individual's diet and not necessarily by requiring the individual to restrict the intake of other foods that he or she desires. It is understood that current research has shown low-glycemic index foods such as the food composition of the present invention can provide, results in relatively lower fluctuations in blood sugar levels and improve to the sensitivity to insulin with the ultimate goal of better blood sugar control in people with insulin resistance and diabetes.

Furthermore, the present invention can be used for weight loss, such as a diet supplement, that may be used to lose weight or control obesity. In operation by providing a timed release of nutrients, including carbohydrates or other sources of nutritional energy, it helps prevent the onset of a hungry feeling in an individual. It assists with this appetite control by providing a relatively level, steady blood sugar/glucose supply and filling the gut with fiber to provide a sense of fullness and satisfaction without overeating. Obesity and low intake of fiber amplify the adverse consequences of high-glycemic load. Consumption of the food composition of the present invention adjusted for a low-glycemic index can lower blood lipids in both diabetics and non-diabetics with elevated blood lipids, and can also be useful in weight loss.

The present invention provides a low-glycemic level, very high fiber, high starch resistance, long/slow digestion time, steady and level carbohydrate delivery or availability.

Viewed another way, one cause of weight gain or obesity is overconsumption of food caused by addressing a feeling of hunger (with all the unpleasant side effects of lightheadedness, irritability, lack of energy, etc.) by eating. The food composition of the present invention provides a diet formula or supplement that allows for weight loss, while still feeling full, or at least not feeling hungry. This is achieved at least in part by the time release property of the food composition. One explanation for the overconsumption of food leading to undesirable or undesired weight gain is a difficulty regulating blood glucose/sugar level—such as can result from a low fiber and/or high glycemic index diet. Such a diet results in an increase in blood glucose level soon after eating. A metabolitic reaction is to respond with relatively high discharges of pancreatic insulin into the blood to drive down the blood glucose level down. Insulin stimulates the body's cells to remove sugar from the bloodstream and utilize it. Next, the body responds with the discharge of glucagon. Glucagon has the opposite effect of insulin and acts as a control mechanism when the body produces too much insulin. It is the lag time effect of this process caused by the shock of low fiber, high glycemic foods that crashes the blood sugar below the fast fasting level. Because of the metabolitic reaction to the consumption of high GI foods, many overweight or obese people can feel hungry again shortly after having eaten, resulting in a cycle of overeating.

Moreover, since the pancreas produces both the insulin and glucagon can become diseased or fail from the roller coaster of insulin and glucagons production, resulting in a frequent form of diabetes (Type II).

The food composition of the present invention provides a high fiber, low glycemic food or meal that delivers a slow, level, and steady stream of complex carbohydrates and nutrients to the consumer. This helps the consumer to regulate his or her blood glucose/sugar and get off the hunger "roller coaster". The present invention thereby allows a desired level of food consumption avoiding a feeling of hunger, while also reducing the desire for further food intake.

Examples 1 and 2 are examples of an oat blend embodiment that can reduce or eliminate a feeling of hunger for an extended period of time, such as for 5-8 hours and has an additional benefit of providing a substantially even, level blood glucose response. This is very useful for people with diabetes and/or obesity. In addition, it is useful for athletes, persons desiring weight loss, and busy/active people that have time to eat one meal, but need it to carry them through for 5 to 8 hours with energy and clarity of thought from steady and level blood glucose.

In another view, the food product can be considered a carbohydrate dosage delivery system that regulates blood glucose levels/response over an approximately 5 to 8 hour period or a more extended period such as for example 3-48 hours, or longer, due to its formulation and servings size (dosage). An example of a use of such a system is for use by diabetics in regulating blood glucose level. Another use is as a type of diet or dieting supplement, which when eaten can reduce a desire to eat by providing an extended or time released carbohydrate (and other nutrition and energy) delivery providing a feeling of fullness over an extended period of time.

Thus, it is seen that a time released food product providing differing rates of digestion and nutrition delivery is provided. One skilled in the art will appreciate that the present invention can be practiced by other than the above-described embodiments, which are presented in this description for purposes of illustration and not of limitation. The description and examples set forth in this specification and associated drawings only set forth embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. A food composition containing components of varying nutrition delivery rates after being cooked comprising:
    a first constituent part comprising a processed grain or seed having a first nutrition delivery rate after being cooked;
    a second constituent part comprising a processed grain or seed present having a second nutrition delivery rate faster than the first constituent part after being cooked substantially as long as the first constituent part; and
    a third constituent part comprising a processed grain or seed having a third nutrition rate faster than the second constituent part after being cooked substantially as long as the first constituent part,
    wherein the cooking time and temperature are selected such that the third constituent part forms a gelatinous composition and the first constituent is less than fully cooked such that it is not gelatinous after being cooked, and
    wherein the first constituent part is present in about 15-35% by volume, the second constituent part is present in about 15-30% by volume, and the third constituent part is present in about 40-70% by volume.

2. The food composition of claim 1 further comprising a gelatinized starch composition coating at least one portion of at least one of the constituent parts.

3. The food composition of claim 1 wherein a natural starch of the second constituent part converts by gelatinization and pasting to coat the other constituent part after being cooked.

4. The food composition of claim 1 wherein the second constituent part includes steel cut oats or groats.

5. The food composition of claim 1 wherein the third constituent part includes rolled oats.

6. A carbohydrate dosage delivery system for use in regulating blood glucose levels over an extended period of time comprising the food composition as recited in claim 1.

7. A weight loss supplement comprising the food composition as recited in claim 1.

8. The food composition of claim 1 wherein the third constituent part includes bumped oat groats or whole oat groats.

9. A method of manufacturing a food composition comprising:
    selecting a first grain or seed constituent part having a first nutrition delivery rate after being cooked;
    selecting a second grain or seed constituent part having a second nutrition delivery rate faster than the first constituent part after being cooked substantially as long as the first constituent part;
    selecting a third grain or seed constituent part having a third nutrition rate faster than the second constituent part after being cooked substantially as long as the first constituent part;
    mixing the first, second, and third constituent parts to form the food composition; and
    cooking the mixed first, second, and third constituent parts such that the first constituent part is fully cooked and the second and third constituent parts are less than fully cooked such that they are not gelatinous, and
    wherein the first constituent part is present in about 15-35% by volume, the second constituent part is present in about 15-30% by volume, and the third constituent part is present in about 40-70% by volume.

10. The method of manufacturing of claim 9 wherein one of the constituent parts gelatinizes when cooked.

11. The method of manufacturing of claim 9 further comprising a gelatinization step comprising cooking the mixed food composition wherein a natural starch of at least one constituent part converts by gelatinization and pasting to coat the other constituent parts when cooked.

12. A food composition containing components of varying nutrition delivery rates after being cooked comprising:
    a first cereal constituent part comprising a whole grain or seed or a de-hulled grain or seed that is not otherwise processed, having a first nutrition delivery rate after being cooked; and
    a second cereal constituent part comprising a grain or seed having a second nutrition delivery rate faster than the first constituent part after being cooked as long as the first constituent part; and
    a third cereal constituent part comprising a grain or seed having a third nutrition rate faster than the second constituent part after being cooked substantially as long as the first constituent part,
    wherein the cooking time and temperature are selected such that the first constituent is less than fully cooked such that it is not gelatinous after being cooked, and
    wherein the first constituent part is present in about 15-35% by volume the second constituent part is present in about 15-30% by volume and the third constituent part is present in about 40-70% by volume.

13. The food composition of claim 12 further comprising a gelatinized starch composition coating at least one portion of at least one of the constituent parts.

14. The food composition of claim 12 wherein the third constituent part forms a gelatinous composition after being cooked.

15. The food composition of claim 12 wherein a natural starch of the third constituent part converts by gelatinization and pasting to coat the other constituent part after being cooked.

16. A carbohydrate dosage delivery system for use in regulating blood glucose levels over an extended period of time comprising the food composition as recited in claim 12.

17. A weight loss supplement comprising the food composition as recited in claim 12.

* * * * *